(12) United States Patent
Ikeda

(10) Patent No.: US 10,600,198 B2
(45) Date of Patent: Mar. 24, 2020

(54) INFORMATION PROCESSING APPARATUS

(71) Applicant: FUJI XEROX CO., LTD., Tokyo (JP)

(72) Inventor: Daisuke Ikeda, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 110 days.

(21) Appl. No.: 15/984,422

(22) Filed: May 21, 2018

(65) Prior Publication Data
US 2019/0180465 A1   Jun. 13, 2019

(30) Foreign Application Priority Data

Dec. 12, 2017   (JP) .................................. 2017-237612

(51) Int. Cl.
| | |
|---|---|
| G06K 9/00 | (2006.01) |
| G06T 7/70 | (2017.01) |
| G06T 7/20 | (2017.01) |
| G06F 3/00 | (2006.01) |
| G06Q 30/02 | (2012.01) |

(52) U.S. Cl.
CPC ............ *G06T 7/70* (2017.01); *G06K 9/00335* (2013.01); *G06K 9/00771* (2013.01); *G06T 7/20* (2013.01); *G06Q 30/0201* (2013.01); *G06T 2207/20024* (2013.01); *G06T 2207/20076* (2013.01); *G06T 2207/30196* (2013.01); *G06T 2207/30242* (2013.01)

(58) Field of Classification Search
CPC .............. G06K 9/00; G06T 7/00; G06F 16/00
USPC ........................................................ 382/103
See application file for complete search history.

(56) References Cited

U.S. PATENT DOCUMENTS 9,541,997 B2 * 1/2017 Morishita ............... G06F 3/011

FOREIGN PATENT DOCUMENTS

| JP | 2001331875 | 11/2001 |
| JP | 2005148839 | 6/2005 |

OTHER PUBLICATIONS

Toshihiro Kamishima, "Algorithms for Recommender Systems," with partial English translation thereof, The Japanese Society for Artificial Intelligence, Nov. 2007-Mar. 2008, vol. 22, No. 6-vol. 23, No. 2, pp. 1-41.

* cited by examiner

*Primary Examiner* — Abolfazl Tabatabai
(74) *Attorney, Agent, or Firm* — JCIPRNET

(57) ABSTRACT

An information processing apparatus includes an acquisition section that acquires first information indicating whether or not a target person performs a specific behavior on a target object disposed in plural places and second information indicating a behavior of the target person and including a stay time in the plural places, for each target person, a calculation section that calculates an evaluation value indicating a probability of the target person who has not performed the specific behavior performing the specific behavior on the target object, based on the acquired first information, and an estimation section that extracts data on the target object disposed in the place having a stay time which is smaller than a predetermined value, based on the acquired second information, and estimates an opportunity loss for the target object based on the evaluation value calculated for the target object.

20 Claims, 5 Drawing Sheets

| PERSON ID | RICE BALL | BOX LUNCH | TEA | CUP NOODLE | ... |
|---|---|---|---|---|---|
| A | 0 | 1 | 1 | 0 | ... |
| B | 0 | 1 | 0 | 0 | ... |
| C | 0 | 1 | 1 | 1 | ... |

| PERSON ID | RICE BALL | BOX LUNCH | TEA | CUP NOODLE | ... |
|---|---|---|---|---|---|
| A | 0.2 | 1 | 1 | 0.8 | ... |
| B | 0 | 1 | 0 | 0 | ... |
| C | 0 | 1 | 1 | 1 | ... |

| PERSON ID | RICE BALL SHELF STAY TIME (SECOND) | BOX LUNCH SHELF STAY TIME (SECOND) | TEA SHELF STAY TIME (SECOND) | CUP NOODLE SHELF STAY TIME (SECOND) | ... |
|---|---|---|---|---|---|
| A | 2 | 10 | 10 | 0 | ... |
| B | 2 | 10 | 10 | 2 | ... |
| C | 0 | 10 | 10 | 10 | ... |

INFORMATION PROCESSING APPARATUS

CROSS-REFERENCE TO RELATED APPLICATIONS

This application is based on and claims priority under 35 USC 119 from Japanese Patent Application No. 2017-237612 filed Dec. 12, 2017.

BACKGROUND

Technical Field

The present invention relates to an information processing apparatus.

SUMMARY

According to an aspect of the invention, there is provided an information processing apparatus which includes an acquisition section that acquires first information indicating whether or not a target person performs a specific behavior on target objects disposed in plural places and second information indicating a behavior of the target person and including a stay time in the plural places, for each target person, a calculation section that calculates an evaluation value indicating a probability of the target person who has not performed the specific behavior performing the specific behavior on the target object, based on the acquired first information, and an estimation section that extracts data on the target object disposed in the place having a stay time which is smaller than a predetermined value based on the acquired second information, and estimates an opportunity loss for the target object based on the evaluation value calculated for the target object.

BRIEF DESCRIPTION OF THE DRAWINGS

Exemplary embodiment(s) of the present invention will be described in detail based on the following figures, wherein.

DETAILED DESCRIPTION

Figure 1:
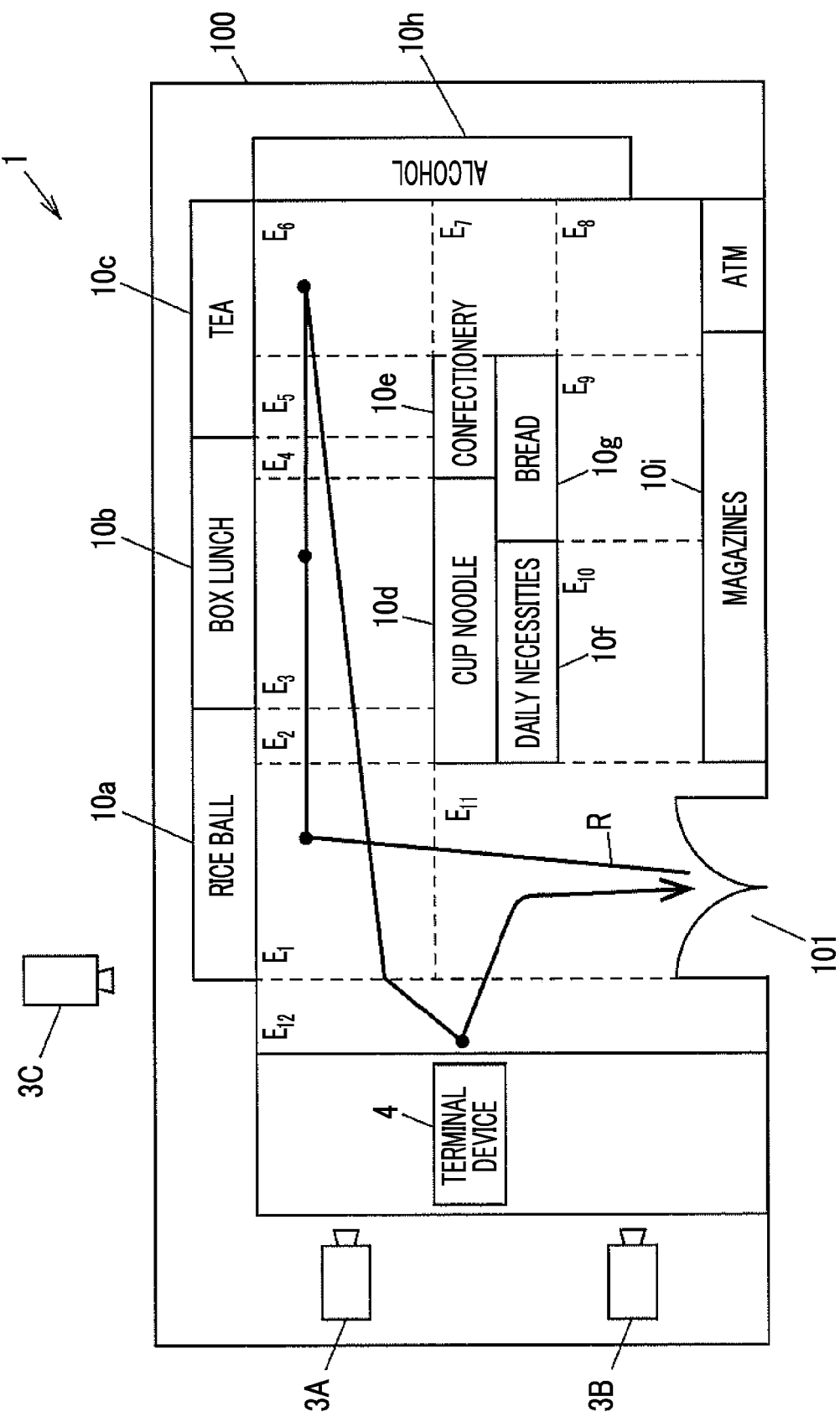
FIG. 1 is a plan view illustrating an example of a layout of an information processing system according to an exemplary embodiment of the present invention.

Hereinafter, an exemplary embodiment of the present invention will be described with reference to the drawings. In the drawings, components having substantially the same function are denoted by the same reference signs and descriptions thereof will not be repeated.

Summary of Exemplary Embodiment

An information processing apparatus according to an exemplary embodiment of the present invention includes an acquisition section that acquires first information indicating whether or not a target person performs a specific behavior on target objects disposed in plural places and second information indicating a behavior of the target person and including a stay time in the plural places, for each target person, a calculation section that calculates an evaluation value indicating a probability of the target person who has not performed the specific behavior performing the specific behavior on the target object, based on the acquired first information, and an estimation section that extracts data on the target object disposed in the place having a stay time which is smaller than a predetermined value, based on the acquired second information, and estimates an opportunity loss for the target object based on the evaluation value calculated for the target object.

"The target objects disposed in the plural places" may be objects different from each other or may include the same object. "The specific behavior" may be a behavior based on the preference of a target person. For example, in a case where the target object is a product, the specific behavior corresponds to purchasing, rental, and the like. In a case where the target object is an exhibit, the specific behavior corresponds to document request and the like. "The place having a stay time which is smaller than a predetermined value" means a place in which it can be considered that the target person does not stop by, for example, a place in a case where the target person does not stop by at all or a case where the target person momentarily stops by. "The predetermined value" is, for example, about 1 or 2 seconds and includes zero. "The opportunity loss" means that, if the target person has noticed the existence of the target object, the target person performs the specific behavior.

FIG. 1 is a plan view illustrating an example of a layout of an information processing system according to an exemplary embodiment of the present invention.

The information processing system 1 may be applied to, for example, a store 100 such as a convenience store, a department store, and a shopping center. In the store 100, for example, plural display cases 10 in which products are displayed, a terminal device 4 used for a clerk performing accounting processing, and plural (for example, three) cameras (first camera 3A, second camera 3B, and third camera 3C (which are simply referred to as "a camera 3" when being collectively referred to)) are arranged. The product is an example of the target object. The display case 10 is an example of the place.

The display case 10 includes display cases 10a to 10d in which rice balls, box lunches, teas, and cup noodles are respectively displayed, and display cases 10e to 10i in which confectionery, daily necessities, bread, alcohol, and magazines are respectively displayed, as the products, for example.

Areas $E_1$ to $E_{12}$ in which a customer may pass are provided in the store 100. A route R illustrated in FIG. 1 indicates a moving route of a customer having a person ID of "A", which is used for identifying a person and will be described later, as an example. The customer is an example of a person and a target person.

An image obtained by imaging of the camera 3 may be a video or a still image obtained by performing imaging plural times for each second. The camera 3 transmits the image obtained by imaging to an information processing apparatus 2 (see FIG. 2) in a wireless or wired manner. The first camera 3A images an inside of the store, which includes the areas $E_1$ to $E_7$, $E_{11}$, and $E_{12}$. The second camera 3B images an inside of the store, which includes the areas $E_7$ to $E_{12}$. The third camera 3C images an inside of the store, which includes the areas $E_1$, $E_{11}$, and $E_{12}$, the terminal device 4, and an entrance 101.

The terminal device 4 is a computer device called a point-of-sale (POS) register disposed on a counter. A customer who enters the store 100 puts a product picked up with a hand, on the counter and performs payment. In a case where a product on sale in the store 100 is purchased by the customer, for example, the terminal device 4 performs processing for accounting, issues a receipt on which purchase of the product is recorded, and generates purchase data indicating that the product has been purchased, for each product. The terminal device 4 transmits the purchase data to the information processing apparatus 2 (see FIG. 2) in a wireless or wired manner.

Figure 2:
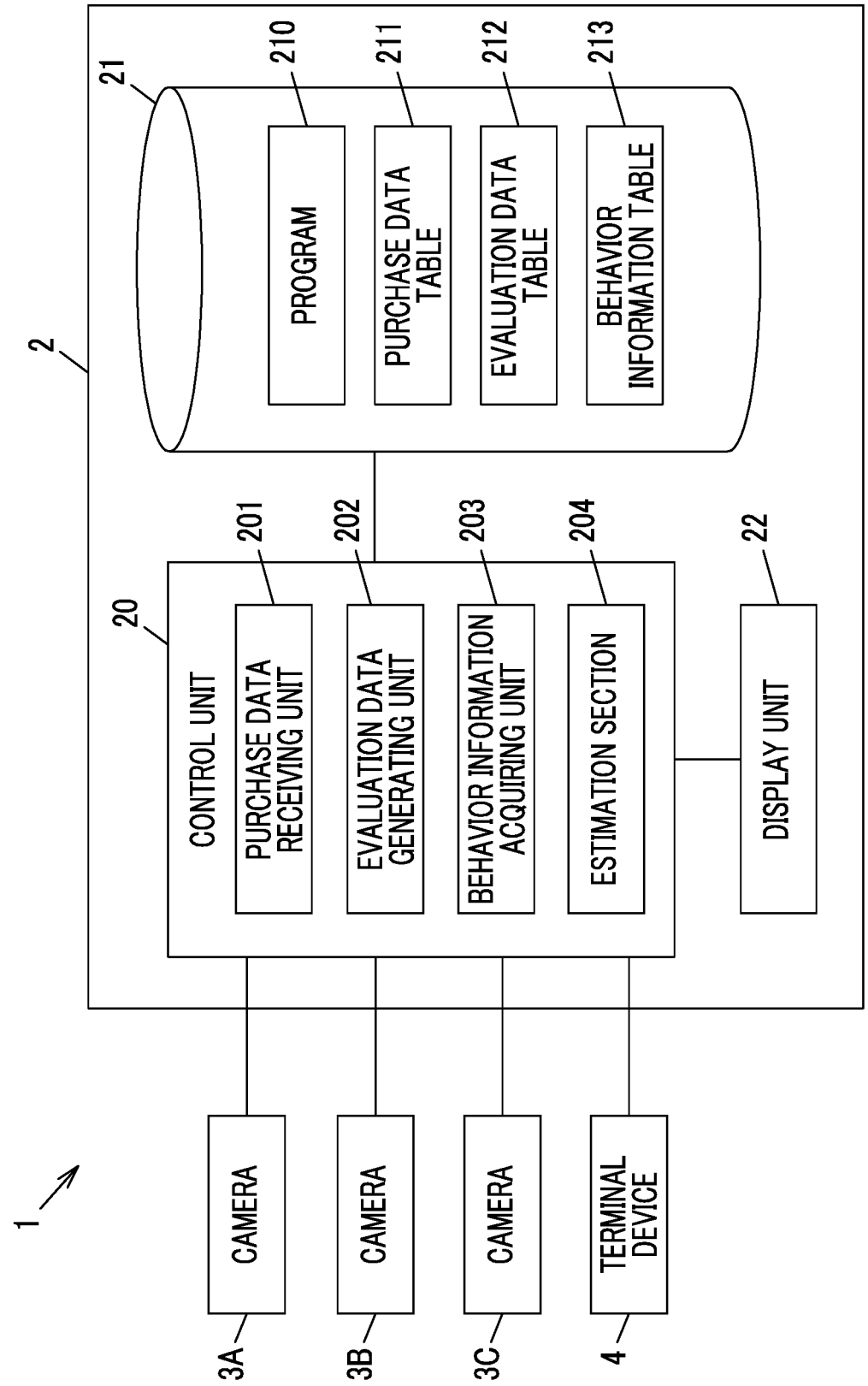
FIG. 2 is a block diagram illustrating an example of a control system in the information processing system.

FIG. 2 is a block diagram illustrating an example of a control system of the information processing system 1. The information processing system 1 includes the information processing apparatus 2 connected to the terminal device 4 and the camera 3A to 3C illustrated in FIG. 1.

The information processing apparatus 2 includes a control unit 20, a storage unit 21, and a display unit 22. The control unit 20 controls units of the information processing apparatus 2. The storage unit 21 stores various kinds of information. The display unit 22 is realized by a display such as a liquid crystal display, and displays various kinds of information.

The control unit 20 is configured with a central processing unit (CPU), an interface, and the like. The CPU operates in accordance with a program 210 stored in the storage unit 21 so as to function as a purchase data receiving unit 201, an evaluation data generating unit 202, a behavior information acquiring unit 203, an estimation section 204, and the like. The purchase data receiving unit 201 and the behavior information acquiring unit 203 are examples of the acquisition section. The evaluation data generating unit 202 is an example of the calculation section. The units 201 to 204 will be described later in detail.

The storage unit 21 is configured with a read only memory (ROM), a random access memory (RAM), and the like. The program 210, a purchase data table 211 (see FIG. 4), an evaluation data table 212 (see FIG. 5), a behavior information table 213 (see FIG. 6), and the like are stored in the storage unit 21. In this specification, recording or registering is used in a case of writing information in a table, and storing is used in a case of writing information in the storage unit. The purchase data table 211 is an example of the first information. The behavior information table 213 is an example of the second information.

The purchase data receiving unit 201 acquires purchase data indicating whether or not a target person purchases a product disposed in the plural display cases 10. Specifically, the purchase data receiving unit 201 receives a person ID for identifying a customer who is performing accounting processing with the terminal device 4, from the behavior information acquiring unit 203. The purchase data receiving unit 201 sequentially receives purchase data of each person ID from the terminal device 4. The purchase data receiving unit 201 records the purchase data of each person ID in the purchase data table 211.

The evaluation data generating unit 202 calculates an evaluation value indicating a probability that the customer purchases a product which has not been purchased by the customer, based on the purchase data table 211. The evaluation data generating unit records the calculated evaluation value in the evaluation data table 212. The evaluation data generating unit 202 calculates the evaluation value by well-known collaborative filtering such as GroupLens. Specifically, the evaluation data generating unit 202 calculates a similarity degree between customers, based on the purchase data table 211. Then, the evaluation data generating unit estimates an evaluation value based on the calculated similarity degree. The similarity degree indicates similarity between preferences to the product. For example, the similarity degree of 1 means a case where the preferences completely coincide with each other.

The behavior information acquiring unit 203 acquires behavior information of a customer from an image obtained by imaging of the camera 3 and records the acquired behavior information in the behavior information table 213. The behavior information includes a stay time of a customer having a person ID assigned thereto, for each display case 10, for example. In this specification, for example, "the stay time" is set to be a time during which the customer is directed toward the display case 10 while being in the front of the display case 10 (for example, within 1 m). Thus, the stay time does not include a time during which the customer is directed toward the display case 10 from a place (for example, position at a distance of 2 m or greater) far from the display case 10 or a time during which the customer is not directed toward the display case 10 even though he or she is in the front of the display case 10. In a case where a customer has an interest in a product, generally, the customer looks at the product. Thus, a time during which the customer is directed toward the display case 10 while being in the front of the display case 10 is set as the stay time, and thereby data on the product corresponding to the preference of the customer may be more accurately extracted in comparison to a case where a time during which the customer is in the front of the display case 10 regardless of being directed toward the display case 10 is set to the stay time. The behavior information acquiring unit 203 determines whether or not the customer is directed toward the display case 10, by analyzing an image which has been obtained by imaging of the camera 3. A time during which the customer is in the front of the display case 10 without determination of whether or not the customer is directed toward the display case 10 may be recorded as the stay time, in the behavior information table 213. A camera may be disposed on each display case 10 and a gaze direction of the customer may be detected. Thus, it may be determined whether or not the customer looks at the display case 10.

The behavior information acquiring unit 203 sequentially takes an image obtained by imaging of the camera 3 and monitors whether or not a person is included in the image. The behavior information acquiring unit 203 determines whether or not a person is included in the image, by determining whether or not a face is included in the image. In a case where the behavior information acquiring unit 203 determines that a person is included in the image, the behavior information acquiring unit assigns a person ID to a customer corresponding to the person in the image and tracks the moving route of the customer in the store. The image obtained by imaging of the camera 3 includes the peripheral parts such as the display case 10, products, and the floor. Thus, the behavior information acquiring unit 203 may specify an area in which the customer is located among the areas $E_1$ to $E_{12}$, based on the positional relationship between the peripheral parts and the customer.

The estimation section 204 extracts data on a product disposed in a display case 10 having a stay time which is smaller than a predetermined value (for example, one second) based on the acquired behavior information table 213.

Then, the estimation section 204 estimates an opportunity loss for the product, based on an evaluation value calculated for the product. The estimation section 204 may estimate the number of target persons counted for each evaluation value, as the opportunity loss for a target object. The estimation section 204 may estimate the number of target persons counted for each evaluation value which is equal to or greater than a predetermined value in the number of target persons counted for each evaluation value, as the opportunity loss for the target object. Further, the estimation section 204 may estimate a ratio of the number of target persons who perform the specific behavior on the target object at a predetermined probability to the number of target persons who come into an area in which the plural places are provided as the opportunity loss for the target object.

Figures 3, 4:
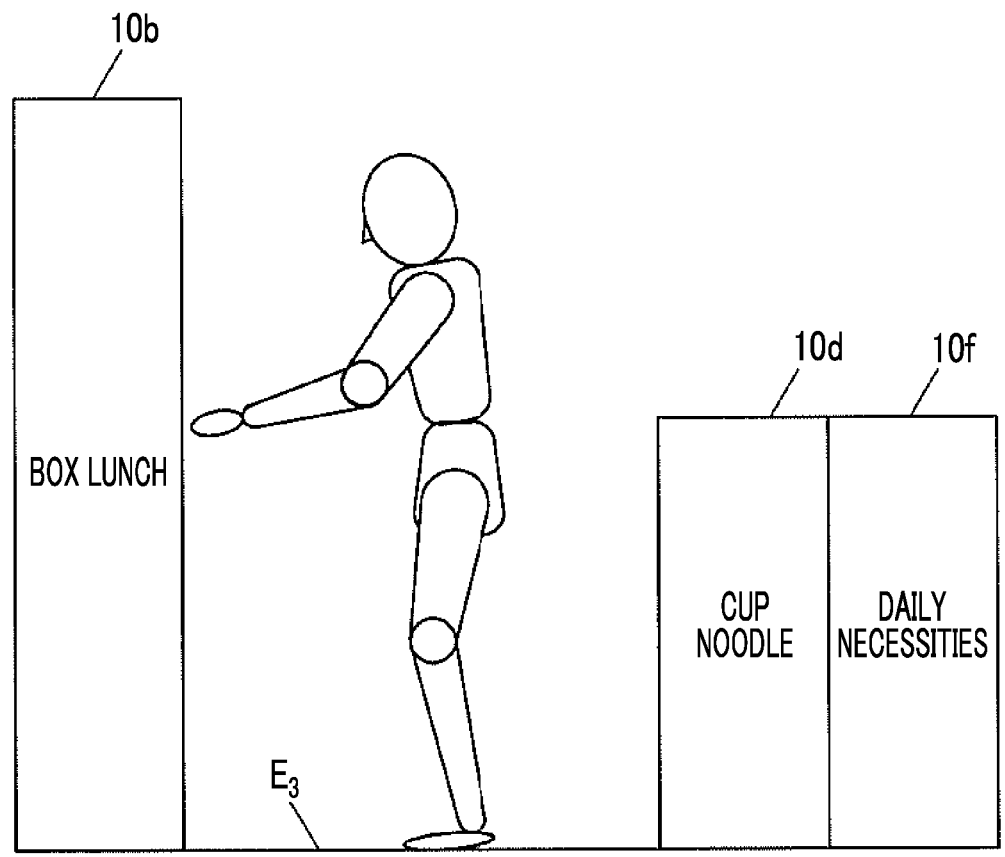
FIG. 3 is a diagram illustrating a stay time.
FIG. 4 is a diagram illustrating an example of a purchase data table.

FIG. 3 is a diagram illustrating the stay time. It is assumed that a customer is in the area $E_4$ and is directed toward the display case 10b of box lunches. In a case where the customer is directed toward the display case 10, the stay time is recorded in association with this display case 10. In a case illustrated in FIG. 3, the customer is directed toward the display case 10b of box lunches, and thus the behavior information acquiring unit 203 acquires a stay time for the display case 10b of box lunches from images. In the case illustrated in FIG. 3, the customer is not directed toward the display case 10d of cup noodles. Thus, the behavior information acquiring unit 203 acquires the stay time for the display case 10d of cup noodles from images even though the customer actually stays in the front of the display case 10d of cup noodles.

FIG. 4 is a diagram illustrating an example of the purchase data table 211. Purchase data indicating whether or not a product as the target object has been purchased is recorded in the purchase data table 211. The purchase data table 211 includes an item of "person ID", in which a person ID for identifying a customer is recorded, and items of "rice ball", "box lunch", "tea", "cup noodle", and the like as products. In a case where a customer having a person ID has purchased a product, the number of purchased products is recorded in the corresponding product item. In FIG. 4, contents that a customer having a person ID of "A" has purchased one box lunch and one tea, a customer having a person ID of "B" has purchased one box lunch, and a customer having a person ID of "C" has purchased one box lunch, one tea, and one cup noodle are recorded. A behavior of a customer purchasing a product is an example of the specific behavior.

Figures 5, 6, 7:
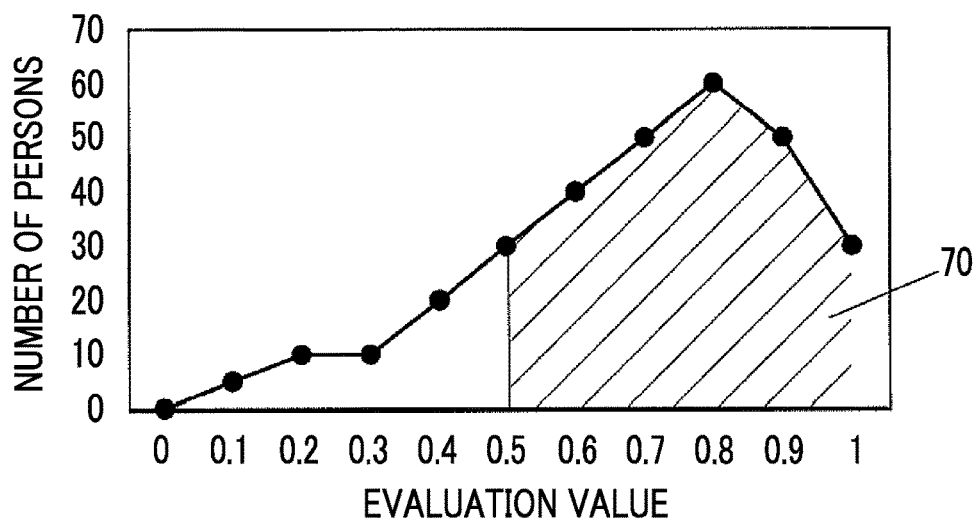
FIG. 5 is a diagram illustrating an example of an evaluation data table.
FIG. 6 is a diagram illustrating an example of a behavior information table.
FIG. 7 is a graph illustrating an example of estimating an opportunity loss.

FIG. 5 is a diagram illustrating an example of the evaluation data table 212. Evaluation data obtained in a manner that purchase data recorded in the purchase data table 211 illustrated in FIG. 4 is evaluated by collaborative filtering is recorded in the evaluation data table 212. Similar to the purchase data table 211 illustrated in FIG. 4, the evaluation data table 212 includes items of "person ID", "rice ball", "box lunch", "tea", "cup noodle", and the like. FIG. 5 illustrates a state where evaluation data only for the customer having a person ID of "A" is recorded. FIG. 5 illustrates that evaluation values for a rice ball and a cup noodle which have not been purchased by the customer having a person ID of "A" are set to 0.2 and 0.8, respectively, for the customer having a person ID of "A".

FIG. 6 is a diagram illustrating an example of the behavior information table 213. The behavior information table 213 includes the item of "person ID" and items of "rice ball shelf", "box lunch shelf", "tea shelf", "cup noodle shelf", and the like as the title of the display case 10. A time during which the customer is in the front of the display case 10 and is directed toward this display case 10 is recorded as the stay time for each title of the display case 10.

FIG. 7 is a graph illustrating an example of estimating the opportunity loss. FIG. 7 focuses on "cup noodle" in which the stay time is smaller than a predetermined value (for example, one second). A horizontal axis indicates an evaluation value and a vertical axis indicates an integrated value obtained by integrating the number of persons corresponding to evaluation values for the product of "cup noodle". In a case of the customer having a person ID of "A", the evaluation value for "cup noodle" is 0.8. Thus, in the graph illustrated in FIG. 7, counting is performed at a place in which the evaluation value is 0.8.

For example, the estimation section 204 may estimate the number (hatched area in FIG. 7) of customers having an evaluation value which is equal to or greater than a value (for example, 0.5), that is, 70, as the opportunity loss for the target object (for example, cup noodle). The number of persons who purchase a cup noodle at a probability (also referred to as a purchase probability) of 50% or greater if the customer who has entered the store 100 has noticed the existence of the cup noodle may be estimated. Thus, it is possible to recommend the layout of the display case 10d of cup noodles to be changed to a place in which a customer easily notices the cup noodles in the display case 10d.

The estimation section 204 may obtain the total number of visitors who have entered the store 100 during a predetermined period (for example, one week or one month). Then, the estimation section 204 may estimate a ratio of the number (hatched area in FIG. 7) of persons having an evaluation value which is equal to or greater than a predetermined value (for example, 0.5), that is, 70, to the obtained total number of visitors, as the opportunity loss for "cup noodle". Even in a case where the total number of visitors varies by changing a counting period, a difference of an opportunity loss between products may be recognized based on the ratio.

Operation of Exemplary Embodiment

Figure 8:
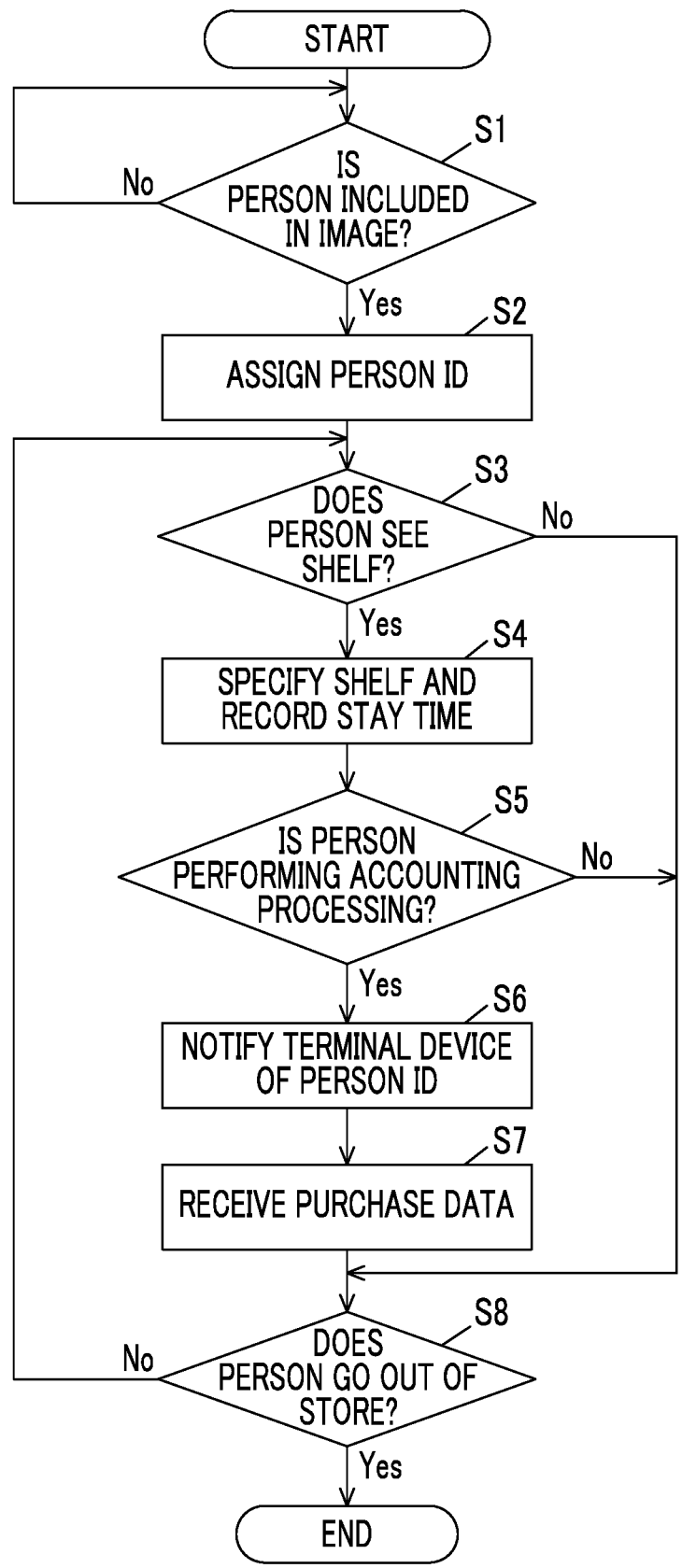
FIG. 8 is a flowchart illustrating an example of an operation of the information processing apparatus.

Next, an example of an operation of the information processing system 1 will be described. FIG. 8 is a flowchart illustrating an example of an operation of the information processing apparatus 2.

The behavior information acquiring unit 203 determines whether or not a person is included in an image obtained by imaging of the camera 3 (S1). In a case where the behavior information acquiring unit determines that the person is included in the image, the behavior information acquiring unit 203 assigns a person ID to the person (S2) and starts tracking a moving route of this person in a store.

The behavior information acquiring unit 203 determines whether or not the person looks at a display case 10 (S3). In a case where the person looks at the display case 10 (Yes in S3), the behavior information acquiring unit 203 specifies the display case 10 at which the person looks based on an image obtained by imaging of the camera 3. The behavior information acquiring unit 203 acquires a stay time and records a stay place and the stay time along with the person ID, in the behavior information table 213 (S4).

The behavior information acquiring unit 203 determines whether or not the person is performing payment processing, based on an image obtained by imaging of the camera 3 (S5). In a case where the person is performing the payment processing (Yes in S5), the behavior information acquiring unit 203 notifies the terminal device 4 of the person ID (S6).

The terminal device 4 transmits purchase data of each person ID to the information processing apparatus 2. The purchase data receiving unit 201 in the information processing apparatus 2 receives the purchase data of each person ID, which has been transmitted from the terminal device 4 (S7).

In a case where the person goes out of the store (S8), counting processing is ended.

In a case where purchase data is recorded in the purchase data table 211 and behavior information is recorded in the behavior information table 213, in a predetermined period (for example, one week or one month), an evaluation value is recorded in the evaluation data table 212 by the evaluation data generating unit 202. An opportunity loss for a product disposed in a place in which it is considered that the customer does not stop by is estimated by the estimation section 204. Then, an estimation result is displayed in the display unit 22.

Hitherto, the exemplary embodiment of the present invention is described. However, exemplary embodiments of the present invention are not limited to the above-described exemplary embodiment and various modifications and various implementations may be made in a range without changing the gist of the present invention. For example, in the exemplary embodiment, the descriptions are made by using a product as the target object. However, the present invention may also be applied to a case using an exhibit as the target object. In this case, the behavior information acquiring unit acquires a stay time of a visitor in the vicinity of each exhibit and records the acquired stay time in the behavior information table. The behavior information acquiring unit acquires a behavior of the visitor having an interest in the exhibit, as the specific behavior. As the specific behavior on an exhibit, a case of giving a high evaluation in a questionnaire, a case of requesting a document, or the like is considered.

In the exemplary embodiment, different products are disposed in the display cases 10. However, the same product may be disposed in some display cases 10 among plural display cases 10. It is possible to recommend a more favorable place based on a purchase probability only by a difference in item placement.

A portion or the entirety of each unit of the control unit 20 may be configured by a hardware circuit such as a field programmable gate array (FPGA) or an application specific integrated circuit (ASIC).

Some of the components in the exemplary embodiment may be omitted or be changed in a range without changing the gist of the present invention. In the flow in the exemplary embodiment, the step may be added, deleted, changed, replaced, or the like in the range without changing the gist of the present invention. A program used in the exemplary embodiment may be provided in a state of being recorded in a computer-readable recording medium such as a CD-ROM. The program used in the exemplary embodiment may be stored in an external server such as a cloud server and be used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    an acquisition section that acquires first information and second information for each target person, the first information indicating whether or not a target person performs a specific behavior on target objects disposed in a plurality of places and the second information indicating a behavior of the target person and including a stay time in the plurality of places;
    a calculation section that calculates an evaluation value based on the acquired first information, the evaluation value indicating a probability of the target person who has not performed the specific behavior performing the specific behavior on the target object; and
    an estimation section that extracts data on the target object disposed in the place having a stay time which is smaller than a predetermined value, based on the acquired second information, and estimates an opportunity loss for the target object based on the evaluation value calculated for the target object.

2. The information processing apparatus according to claim 1,
    wherein the estimation section estimates the number of target persons counted for each evaluation value, as the opportunity loss for the target object.

3. The information processing apparatus according to claim 2,
    wherein the estimation section estimates the number of target persons counted for each evaluation value which is equal to or greater than a predetermined value in the number of target persons counted for each evaluation value, as the opportunity loss for the target object.

4. The information processing apparatus according to claim 3,
    wherein the calculation section calculates the evaluation value by using collaborative filtering.

5. The information processing apparatus according to claim 4,
    wherein the stay time in the second information is obtained by excluding a time during which the target person is not directed toward the target object.

6. The information processing apparatus according to claim 3,
    wherein the stay time in the second information is obtained by excluding a time during which the target person is not directed toward the target object.

7. The information processing apparatus according to claim 2,
    wherein the estimation section estimates a ratio of the number of target persons who perform the specific behavior on the target object at a predetermined probability to the number of target persons coming into an area in which the plurality of places are provided, as the opportunity loss for the target object.

8. The information processing apparatus according to claim 7,
    wherein the calculation section calculates the evaluation value by using collaborative filtering.

9. The information processing apparatus according to claim 8,
    wherein the stay time in the second information is obtained by excluding a time during which the target person is not directed toward the target object.

10. The information processing apparatus according to claim 7,
    wherein the stay time in the second information is obtained by excluding a time during which the target person is not directed toward the target object.

11. The information processing apparatus according to claim 2,
wherein the calculation section calculates the evaluation value by using collaborative filtering.

12. The information processing apparatus according to claim 11,
wherein the stay time in the second information is obtained by excluding a time during which the target person is not directed toward the target object.

13. The information processing apparatus according to claim 2,
wherein the stay time in the second information is obtained by excluding a time during which the target person is not directed toward the target object.

14. The information processing apparatus according to claim 13,
wherein it is determined whether or not the target person is directed toward the target object, based on an image obtained by imaging.

15. The information processing apparatus according to claim 1,
wherein the calculation section calculates the evaluation value by using collaborative filtering.

16. The information processing apparatus according to claim 15,
wherein the stay time in the second information is obtained by excluding a time during which the target person is not directed toward the target object.

17. The information processing apparatus according to claim 1,
wherein the stay time in the second information is obtained by excluding a time during which the target person is not directed toward the target object.

18. The information processing apparatus according to claim 17,
wherein it is determined whether or not the target person is directed toward the target object, based on an image obtained by imaging.

19. The information processing apparatus according to claim 1,
wherein the specific behavior is a behavior of purchasing the target object.

20. The information processing apparatus according to claim 1,
wherein the specific behavior is a behavior of showing an interest in the target object as an exhibit.

* * * * *